(12) United States Patent
Miwa et al.

(10) Patent No.: US 12,549,109 B2
(45) Date of Patent: Feb. 10, 2026

(54) RECTIFIER CIRCUIT AND POWER SUPPLY USING THE SAME

(71) Applicant: Hitachi Power Semiconductor Device, Ltd., Ibaraki (JP)

(72) Inventors: Yoshihiro Miwa, Tokyo (JP); Hiroyuki Shoji, Tokyo (JP); Junichi Sakano, Tokyo (JP); Tomoyuki Utsumi, Hitachi (JP); Takahiro Higuchi, Hitachi (JP)

(73) Assignee: MINEBEA POWER SEMICONDUCTOR DEVICE INC., Ibaraki (JP)

( * ) Notice: Subject to any disclaimer, the term of this patent is extended or adjusted under 35 U.S.C. 154(b) by 212 days.

(21) Appl. No.: 18/580,783

(22) PCT Filed: May 10, 2022

(86) PCT No.: PCT/JP2022/019765
§ 371 (c)(1),
(2) Date: Jan. 19, 2024

(87) PCT Pub. No.: WO2023/047694
PCT Pub. Date: Mar. 30, 2023

(65) Prior Publication Data
US 2024/0364229 A1    Oct. 31, 2024

(30) Foreign Application Priority Data

Sep. 21, 2021    (JP) ................. 2021-153029

(51) Int. Cl.
*H02M 7/217*    (2006.01)
*H02M 1/08*    (2006.01)
*H02M 3/335*    (2006.01)

(52) U.S. Cl.
CPC ............. *H02M 7/217* (2013.01); *H02M 1/08* (2013.01); *H02M 3/33573* (2021.05)

(58) Field of Classification Search
CPC .. H02M 7/217; H02M 3/33592; H02M 1/083; H02M 7/2195
See application file for complete search history.

(56) References Cited

U.S. PATENT DOCUMENTS 6,246,594 B1    6/2001    Matsuda et al.
6,421,262 B1    7/2002    Saxelby et al.
(Continued)

FOREIGN PATENT DOCUMENTS

JP    2001-037221 A    2/2001
JP    2001-251861 A    9/2001
(Continued)

OTHER PUBLICATIONS

International Search Report of PCT/JP2022/019765 dated Jul. 9, 2022.

*Primary Examiner* — Kyle J Moody
(74) *Attorney, Agent, or Firm* — MATTINGLY & MALUR, PC

(57) ABSTRACT

An effective technique is applied to a rectifier circuit that performs synchronous rectification using a switching element. The rectifier circuit performs the synchronous rectification using a MOSFET, for example, as the switching element. By using the rectifier circuit, a capacitance of a capacitor for supplying power to a drive circuit can be reduced. As a result, downsizing and cost reduction of the rectifier circuit and the power supply using the rectifier circuit can be achieved.

12 Claims, 6 Drawing Sheets

(56) References Cited

U.S. PATENT DOCUMENTS

| | | | |
|---|---|---|---|
| 6,747,880 B2* | 6/2004 | Grover | H03K 17/063 363/21.06 |
| 10,079,536 B2* | 9/2018 | Ishimaru | H02K 7/006 |
| 10,594,224 B2* | 3/2020 | Huang | H02M 3/3353 |
| 10,756,645 B1 | 8/2020 | Chen et al. | |
| 2017/0179846 A1 | 6/2017 | Hui et al. | |
| 2018/0191152 A1 | 7/2018 | Ishimaru et al. | |
| 2021/0111640 A1 | 4/2021 | Heath et al. | |
| 2022/0173652 A1 | 6/2022 | Kusama et al. | |

FOREIGN PATENT DOCUMENTS

| | | |
|---|---|---|
| JP | 2015-111969 A | 6/2015 |
| JP | 2018-088725 A | 6/2018 |
| JP | 2021-520774 A | 8/2021 |
| WO | 2020/189317 A1 | 9/2020 |

\* cited by examiner

RECTIFIER CIRCUIT AND POWER SUPPLY USING THE SAME

TECHNICAL FIELD

The present invention relates to a configuration of a rectifier circuit and a power supply using the same, and particularly relates to an effective technique applied to a rectifier circuit that performs synchronous rectification using a switching element such as a metal oxide semiconductor field-effect transistor (MOSFET).

BACKGROUND ART

In order to rectify an alternating current to a direct current, synchronous rectification is used in which a diode is replaced with a switching element such as a MOSFET. Rectification using a diode has a problem that a loss is great because a voltage drop occurs due to a built-in potential of the diode. On the other hand, for example, in synchronous rectification using a MOSFET, since no built-in potential of the MOSFET exists and a forward current rises from 0 V, the loss is low. Therefore, in particular, in a switching mode power supply such as a front end power supply with strict efficiency regulation, synchronous rectification mainly using a MOSFET is used for performing rectification to lower loss.

Examples of a background art of the present technical field include techniques of PTL 1 and PTL 2.

PTL 1 and PTL 2 disclose rectifier circuits that achieve synchronous rectification.

These rectifier circuits each mainly include a MOSFET for synchronous rectification and a drive circuit thereof, a capacitor that supplies power to the drive circuit, a switching element that controls a voltage of the capacitor, and a control circuit thereof. The drive circuit controls on/off of the MOSFET based on a threshold voltage of the drive circuit and a detected drain-source voltage of the MOSFET.

The capacitor that supplies power to the drive circuit is charged with an electric current flowing through a path of a drain terminal of the MOSFET, the capacitor, and a source terminal of the MOSFET after the MOSFET is turned off. When charging of the capacitor is started, the voltage of the capacitor increases so as to follow the drain-source voltage of the MOSFET.

Here, in a case where the drain-source voltage of the MOSFET is very greater than an operating voltage of the drive circuit or the like, the voltage of the capacitor needs to be equal to or lower than a target voltage so that an excessive voltage is not applied to the capacitor, the drive circuit, the gate of the MOSFET, and the like.

In such a rectifier circuit, after the voltage of the capacitor reaches the target voltage, the switching element inserted between the drain terminal of the MOSFET and a positive electrode terminal of the capacitor is turned off to cut off the charging current of the capacitor. As a result, the voltage of the capacitor is made equal to or lower than the target voltage.

Thereafter, since the power accumulated in the capacitor is consumed as standby power of the drive circuit, the voltage of the capacitor decreases. Thereafter, since the power accumulated in the capacitor is used as power consumption of the drive circuit or generation of the gate-source voltage of the MOSFET, the voltage of the capacitor continues to decrease until the MOSFET is again turned off and charging of the capacitor is started after the on period of the MOSFET.

As described above, the capacitance of the capacitor is selected such that the voltage of the capacitor is equal to or higher than, for example, an operation guarantee voltage of the drive circuit or a gate threshold voltage of the MOSFET during the period from the completion of charging of the capacitor to the start of charging of the capacitor again.

CITATION LIST

Patent Literatures

PTL 1: JP 2001-251861 A
PTL 2: U.S. Pat. No. 10,756,645

SUMMARY OF INVENTION

Technical Problem

As described above, in the conventional rectifier circuits disclosed in PTL 1 and PTL 2, a capacitor that supplies power to the drive circuit of the MOSFET for synchronous rectification is required, and the volume of the capacitor is a harmful effect on downsizing and cost reduction of the rectifier circuits.

Therefore, an object of the present invention is to provide a rectifier circuit that performs synchronous rectification using a switching element such as a MOSFET and is capable of reducing a capacitance of a capacitor for supplying power to a drive circuit of a switching element for synchronous rectification, and a power supply using the rectifier circuit.

Solution to Problem

In order to solve the above problem, the present invention provides a rectifier circuit having an anode and a cathode, the rectifier circuit including a first switching element having a first terminal connected to the cathode of the rectifier circuit and a second terminal connected to the anode of the rectifier circuit, a first diode having a cathode connected to the first terminal and an anode connected to the second terminal, a second switching element having a third terminal connected to the first terminal, a second diode having an anode connected to a fourth terminal of the second switching element, a first capacitor having a positive electrode terminal connected to a cathode of the second diode and a negative electrode terminal connected to the second terminal, a comparator that detects a voltage between the fourth terminal and the second terminal and obtains power from the first capacitor, a gate driver having an input terminal connected to an output terminal of the comparator and an output terminal connected to a fifth terminal of the first switching element, the fifth terminal for control of the first switching element, the gate driver controlling the first switching element based on an output signal from the comparator, and a control circuit connected to a sixth terminal of the second switching element receiving a signal for controlling the second switching element. The control circuit controls the second switching element to be always in an on state and controls a voltage between the sixth terminal and the fourth terminal of the second switching element so that a voltage of the first capacitor does not become greater than a predetermined target voltage so as to control a current flowing from the third terminal to the fourth terminal of the second switching element.

Advantageous Effects of Invention

According to the present invention, it is possible to achieve a rectifier circuit that performs synchronous rectification using a switching element such as a metal oxide semiconductor field-effect transistor (MOSFET) and is capable of reducing a capacitance of a capacitor for supplying power to a drive circuit of the switching element for synchronous rectification, and a power supply using the rectifier circuit.

Accordingly, downsizing and cost reduction of the rectifier circuit and the power supply using the rectifier circuit can be achieved.

Problems, configurations, and effects other than those described above will be clarified by the following description of embodiments.

DESCRIPTION OF EMBODIMENTS

Figure 1:
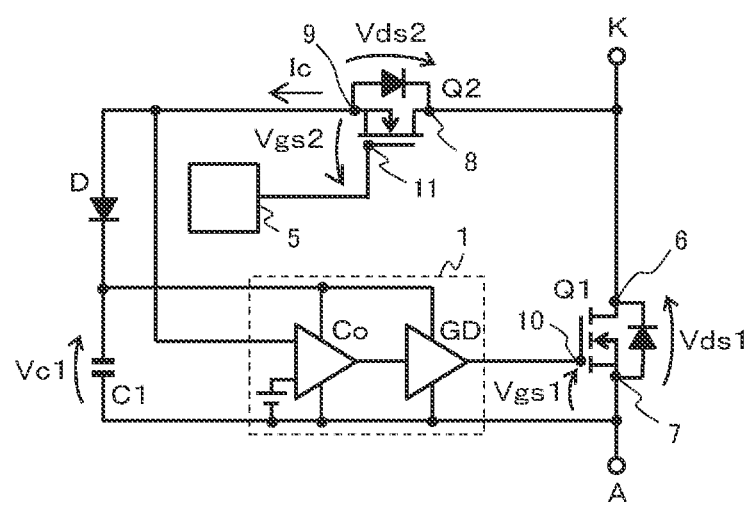
FIG. 1 is a diagram illustrating a configuration of a rectifier circuit according to a first embodiment of the present invention.

Hereinafter, preferred embodiments of the present invention will be described with reference to the drawings. Note that in the drawings, the same components are denoted by the same reference numerals, and the detailed description of overlapping components is omitted.

In addition, in each drawing, a drain terminal of a metal oxide semiconductor field-effect transistor (MOSFET) Q1 is illustrated as a first terminal 6, a source terminal of the MOSFET Q1 as a second terminal 7, a drain terminal of a MOSFET Q2 as a third terminal 8, a source terminal of the MOSFET Q2 as a fourth terminal 9, a gate terminal of the MOSFET Q1 as a fifth terminal 10, a gate terminal of the MOSFET Q2 as a sixth terminal 11, one terminal of a resistor R1 as a seventh terminal 12, the other terminal of the resistor R1 as an eighth terminal 13, one terminal of a resistor R2 as a ninth terminal 14, and the other terminal of the resistor R2 as a tenth terminal 15.

Hereinafter, description will be given on the premise of the above definition.

First Embodiment

Figure 2:
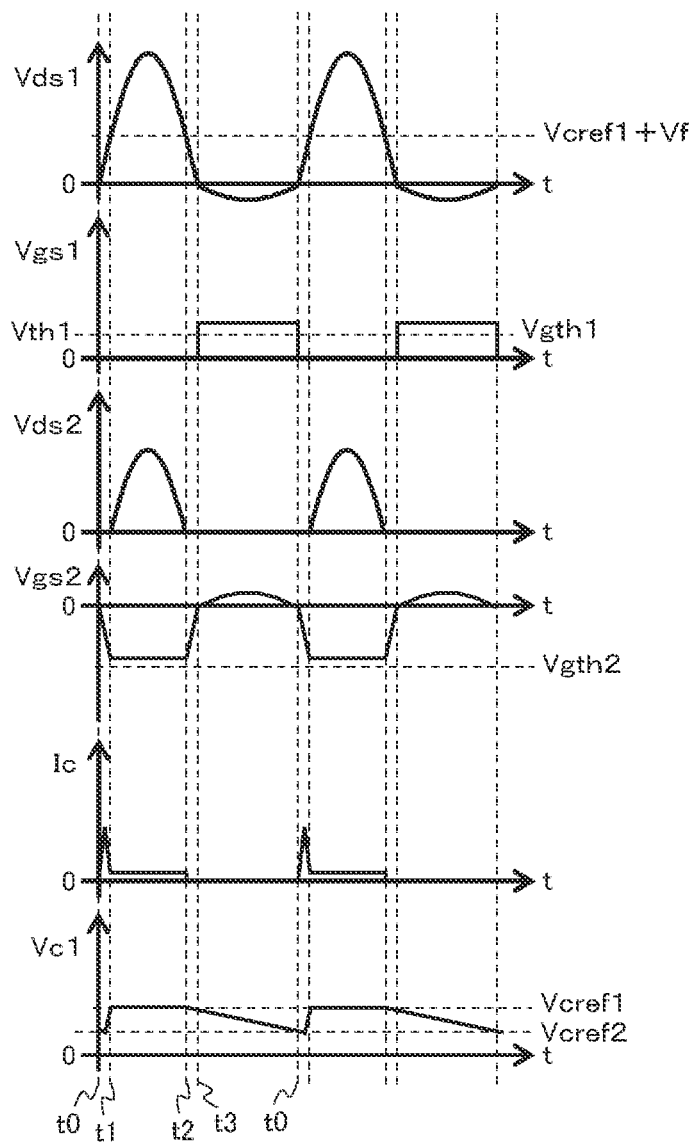
FIG. 2 is a diagram illustrating operation waveforms of the rectifier circuit of FIG. 1.
Figure 9:
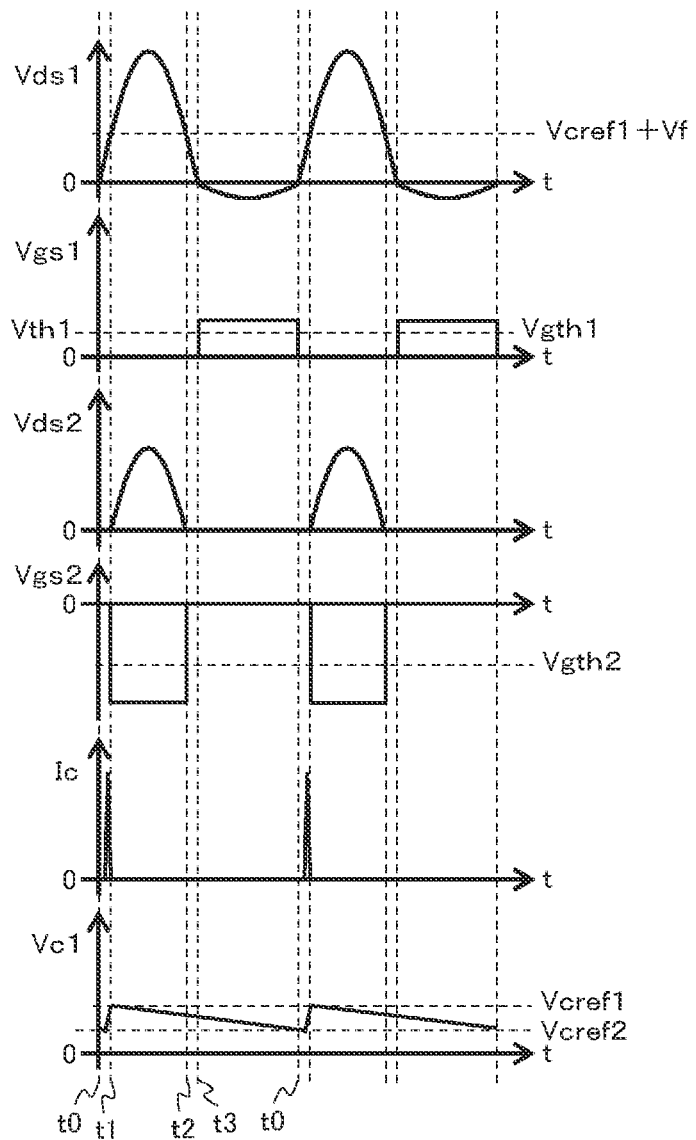
FIG. 9 is a diagram illustrating operation waveforms of a conventional rectifier circuit.

A configuration of a rectifier circuit according to a first embodiment of the present invention and a control method thereof will be described with reference to FIGS. 1, 2, and 9. FIG. 1 is a diagram illustrating the configuration of the rectifier circuit of the present embodiment, and FIG. 2 is a diagram illustrating operation waveforms of the rectifier circuit of FIG. 1. Note that FIG. 9 is a diagram illustrating operation waveforms of a conventional rectifier circuit illustrated as a comparative example for easy understanding of the present invention.

First, the configuration of the rectifier circuit according to the present embodiment will be described with reference to FIG. 1. As illustrated in FIG. 1, the rectifier circuit of the present embodiment includes the MOSFET Q1, a drive circuit 1 thereof, the MOSFET Q2, a control circuit 5 thereof, a diode D, and a capacitor C1.

The drive circuit 1 of the MOSFET Q1 includes a comparator Co and a gate driver GD.

In FIG. 1, the MOSFET Q1 and the MOSFET Q2 are illustrated as an n-channel enhancement MOSFET and an n-channel depletion MOSFET, respectively. However, the MOSFET Q1 and the MOSFET Q2 may be replaced with other switching elements or diodes together with body diodes incorporated in the MOSFETs.

Next, a control method of the rectifier circuit of FIG. 1 will be described with reference to FIG. 2. FIG. 2 illustrates the operation waveforms of the rectifier circuit in a case where a resistive load is connected to a bridge including four rectifier circuits illustrated in FIG. 1 and a sinusoidal voltage is input.

At time t0, a rectification period ends and a non-rectification period starts.

A period from time t0 to time t1 is the non-rectification period, and the MOSFET Q1 is in an off state. In addition, a drain-source voltage Vds1 of the MOSFET Q1 increases as the sinusoidal voltage input to the bridge increases.

In addition, a gate-source voltage Vgs2 of the MOSFET Q2 is greater than a gate threshold voltage Vgth2 of the MOSFET Q2, and the MOSFET Q2 is in the on state.

When the drain-source voltage Vds1 of the MOSFET Q1 becomes greater than the sum of a voltage Vc1 of the capacitor C1 and a forward voltage Vf of the diode D, charging of the capacitor C1 is started, and the voltage Vc1 of the capacitor C1 increases. The charging current of the capacitor C1 flows through a path of the drain terminal of the MOSFET Q1, the MOSFET Q2, the diode D, the capacitor C1, and the source terminal of the MOSFET Q1.

Time t1 is when the drain-source voltage Vds1 of the MOSFE1 Q1 is equal to the sum of a target maximum voltage Vcref1 of the capacitor C1 and the forward voltage Vf of the diode D. The target maximum voltage Vcref1 of the capacitor C1 is selected to prevent an excessive voltage from being applied to the capacitor C1, the drive circuit 1, the gate of the MOSFET Q1, and the like. The target maximum voltage Vcref1 may be, for example, equal to or less than a lowest maximum rated voltage selected from a maximum rated voltage of the comparator Co, a maximum rated voltage of the gate driver GD, or a maximum rated voltage between the gate and the source of the MOSFET Q1.

A period from time t1 to time t2 is a non-rectification period, and the MOSFET Q1 is in the off state. Further, as the sinusoidal voltage input to the bridge increases, the drain-source voltage Vds1 of the MOSFET Q1 increases and then decreases.

In addition, the gate-source voltage Vgs2 of the MOSFET Q2 is greater than the gate threshold voltage Vgth2 of the MOSFET Q2, and the MOSFET Q2 is always in the on state.

However, the gate-source voltage Vgs2 of the MOSFET Q2 is controlled so that the voltage Vc1 of the capacitor C1 is not greater than the target maximum voltage Vcref1 of the capacitor C1. As a result, the current flowing from the drain to the source of the MOSFET Q2 is controlled.

Specifically, the gate-source voltage Vgs2 of the MOSFET Q2 is maintained around the gate threshold voltage Vgth2 of the MOSFET Q2 so that the on resistance of the MOSFET Q2 becomes high. At this time, a voltage of difference between the drain-source voltage Vds1 of the MOSFET Q1 and the sum of the voltage Vc1 of the capacitor C1 and the forward voltage Vf of the diode D is applied between the drain and the source of the MOSFET Q2.

During this period, the power accumulated in the capacitor C1 is consumed as standby power of the drive circuit 1. On the other hand, a charging current of the capacitor C1 flowing through the path from the drain of the MOSFET Q1, the MOSFET Q2, the diode D, the capacitor C1, and the source of the MOSFET Q1 is not cut off, and the capacitor C1 is charged, thus suppressing a decrease in the voltage of the capacitor C1.

A period from time t2 to time t3 is a non-rectification period, and the MOSFET Q1 is in the off state. Further, the drain-source voltage Vds1 of the MOSFET Q1 decreases as the sinusoidal voltage input to the bridge decreases.

During this period, the gate-source voltage Vgs2 of the MOSFET Q2 is greater than the gate threshold voltage Vgth2 of the MOSFET Q2, and the MOSFET Q2 is in the on state. On the other hand, since the drain-source voltage Vds1 of the MOSFET Q1 is smaller than the sum of the voltage Vc1 of the capacitor C1 and the forward voltage Vf of the diode D, the capacitor C1 is not charged. At this time, the diode D prevents a charge accumulated in the capacitor C1 from flowing into the drain terminal of the MOSFET Q1.

During this period, the power accumulated in the capacitor C1 is consumed as the standby power of the drive circuit 1, but since the capacitor C1 is not charged, the voltage Vc1 of the capacitor C1 decreases.

A period from time t3 to time t0 is a rectification period, and a rectified current flows from an anode A to a cathode K.

In addition, the gate-source voltage Vgs2 of the MOSFET Q2 is greater than the gate threshold voltage Vgth2 of the MOSFET Q2, and the MOSFET Q2 is in the on state.

The comparator Co detects the drain-source voltage Vds1 of the MOSFET Q1 from the source terminal of the MOSFET Q2 and the source terminal of the MOSFET Q1. The drive circuit 1 turns on and off the MOSFET Q1 based on the detected voltage.

A specific method for controlling the MOSFET Q1 will be described.

The rectified current flowing from the anode A to the cathode K first flows through the body diode of the MOSFET Q1. Due to the voltage drop of the body diode, the drain-source voltage Vds1 of the MOSFET Q1 has a negative value.

When the voltage detected by the comparator Co becomes smaller than a first threshold voltage of the comparator Co, the comparator Co outputs an on signal, and the gate driver GD pulls up the gate-source voltage Vgs1 of the MOSFET Q1 to the voltage Vc1 of the capacitor C1, so that the MOSFET Q1 is turned on.

Thereafter, the drain-source voltage Vds1 of the MOSFET Q1 becomes a voltage determined by the rectified current and the on resistance of the MOSFET Q1.

The rectified current decreases over time. As the rectified current decreases, the drain-source voltage Vds1 of the MOSFET Q1 increases. When the voltage detected by the comparator Co becomes greater than a second threshold voltage of the comparator Co, the comparator Co outputs an OFF signal, and the gate driver GD pulls down the gate-source voltage Vgs1 of the MOSFET Q1 to 0 V, so that the MOSFET Q1 is turned off.

The first threshold voltage and the second threshold voltage of the comparator Co may have the same value, or the first threshold voltage may be smaller than the second threshold voltage. When the first threshold voltage is smaller than the second threshold voltage, it is possible to suppress chattering such that a MOSFET turns on and off repeatedly in a short period.

During this period, the MOSFET Q2 is in the on state. On the other hand, since the drain-source voltage Vds1 of the MOSFET Q1 is smaller than the sum of the voltage Vc1 of the capacitor C1 and the forward voltage Vf of the diode D, the capacitor C1 is not charged.

As a result, during this period, the power accumulated in the capacitor C1 is used for the power consumption of the drive circuit 1 and the generation of the gate-source voltage Vgs1 of the MOSFET Q1, but since the capacitor C1 is not charged, the voltage of the capacitor C1 decreases.

The rectifier circuit of the present embodiment achieves synchronous rectification by repeating the above control.

The voltage of the capacitor C1 continues to decrease during a period from time t2 until the charging of the capacitor C1 is started again during a period from time t0 to time t1.

During this period, it is necessary to select the capacitance of the capacitor C1 so that the voltage Vc1 of the capacitor C1 is equal to or higher than a target minimum voltage Vcref2 of the capacitor C1. The target minimum voltage Vcref2 is, for example, a minimum operating voltage of the drive circuit 1 or has a value larger than the gate threshold voltage Vgth1 of the MOSFET Q1 such that the on resistance of the MOSFET Q1 becomes sufficiently small.

Next, a method for controlling a conventional rectifier circuit will be described with reference to FIG. 9, and the effect of the rectifier circuit of the present invention will be described.

Although not illustrated, the conventional rectifier circuit includes the MOSFET Q1, the drive circuit 1 thereof, the MOSFET Q2, the control circuit 5 thereof, the diode D, and the capacitor C1, similarly to the rectifier circuit of the present embodiment illustrated in FIG. 1. However, the MOSFET Q1 and the MOSFET Q2 may be replaced with other switching elements or diodes.

As illustrated in FIGS. 2 and 9, the rectifier circuit of the present invention and the conventional rectifier circuit are different from each other in the method for controlling the MOSFET Q2 during the period from time t1 to time t2.

As illustrated in FIG. 9, in the conventional rectifier circuit, the charging of the capacitor C1 is started during a period from time t0 to time t1, the voltage Vc1 of the capacitor C1 increases, and when the voltage of the capacitor C1 reaches the target maximum voltage Vcref1 at time t1, the MOSFET Q2 is turned off.

During the period from time t1 to time t2, the MOSFET Q2 is in an OFF state, and for this period the charging current to the capacitor C1 is cut off so that the voltage Vc1 of the capacitor C1 is not greater than the target maximum voltage Vcref1. During the period from time t1 to time t2, the power accumulated in the capacitor C1 is consumed as the standby power of the drive circuit 1, but since the capacitor C1 is not charged, the voltage Vc1 of the capacitor C1 decreases.

After time t1, time t2, and time t3, since the power accumulated in the capacitor C1 is used for the power consumption of the drive circuit 1 and the generation of the gate-source voltage Vgs1 of the MOSFET Q1, the voltage Vc1 of the capacitor C1 continues to decrease until the charging of the capacitor C1 is again started during the period from time t0 to time t1.

During this period, the capacitance of the capacitor C1 has to be selected so that the voltage Vc1 of the capacitor C1 is equal to or greater than the target minimum voltage Vcref2 of the capacitor C1.

On the other hand, in the rectifier circuit of the present invention, as illustrated in FIG. 2, compared with the conventional rectifier circuit, the period during which the capacitor C1 is not charged can be reduced by the period from time t1 to time t2.

That is, a voltage drop of the capacitor C1 during the off-period of the MOSFET Q1 can be suppressed, and a required capacitance of the capacitor C1 can be reduced.

As an advantage of the present embodiment, the required capacitance of the capacitor can be reduced by suppressing the voltage drop of the capacitor that supplies power to the drive circuit of the switching element for synchronous rectification during the non-rectification period.

As a result, the volume of the capacitor C1 is reduced, which contributes to downsizing and cost reduction of the rectifier circuit. Further, it is possible to use a drive circuit and a control integrated circuit (IC) that consume a large amount of power during the off-period of the MOSFETs.

Second Embodiment

Figure 3:
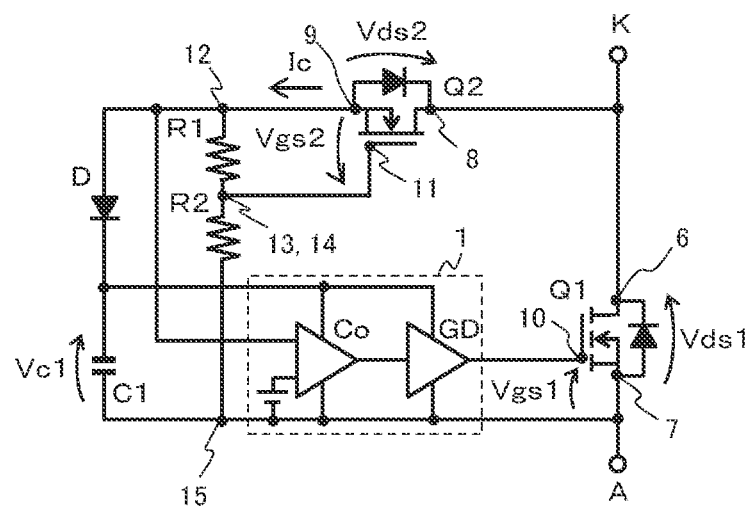
FIG. 3 is a diagram illustrating a configuration of a rectifier circuit according to a second and fifth embodiments of the present invention.

A configuration of a rectifier circuit according to a second embodiment of the present invention and a control method thereof will be described with reference to FIG. 3. FIG. 3 is a diagram illustrating the configuration of the rectifier circuit according to the present embodiment.

As illustrated in FIG. 3, the rectifier circuit of the present embodiment includes, as the control circuit 5 of the MOSFET Q2, a resistor R1 connected between the source terminal and the gate terminal of the MOSFET Q2, and a resistor R2 connected between the gate terminal of the MOSFET Q2 and the source terminal of the MOSFET Q1. The resistor R1 and the resistor R2 are connected in series between the source terminal of the MOSFET Q2 and the source terminal of the MOSFET Q1.

Note that, similarly to the first embodiment (FIG. 1), an n-channel enhancement MOSFET and an n-channel depletion MOSFET are used respectively as the MOSFET Q1 and the MOSFET Q2.

One terminal of the resistor R1 is connected to the source terminal of the MOSFET Q2, and the other terminal of the resistor R1 is connected to the gate terminal of the MOSFET Q2. In addition, one terminal of the resistor R2 is connected to the gate terminal of the MOSFET Q2, and the other terminal of the resistor R2 is connected to the source terminal of the MOSFET Q1.

The operation of the rectifier circuit of the present embodiment (FIG. 3) will be described with reference to FIG. 2. The same operation as the operation described in the first embodiment will be repeatedly described and thus will be omitted.

During the period from time t0 to time t1, the drain-source voltage Vds1 of the MOSFET Q1 is applied to the MOSFET Q2, the resistor R1, and the resistor R2. At time t0, since the drain-source voltage Vds1 of the MOSFET Q1 is 0, the voltage to be applied to the resistor R1, that is, the voltage of the gate-source voltage Vgs2 of the MOSFET Q2 becomes 0. Since the MOSFET Q2 is an n-channel depletion MOSFET, the gate threshold voltage Vgth2 of the MOSFET Q2 has a negative value, and the MOSFET Q2 is in an ON state.

Thereafter, when the drain-source voltage Vds1 of the MOSFET Q1 increases, the current flowing from the drain terminal of the MOSFET Q2 to the resistor R1 via the source terminal of the MOSFET Q2 increases. At this time, since the voltage to be applied to the resistor R1, that is, the gate-source voltage Vgs2 of the MOSFET Q2 decreases, the on-resistance of the MOSFET Q2 increases and functions to decrease the current flowing through the resistor R1. As a result, at time t1, the current flowing through the resistor R1 reaches a certain value and does not increase any more.

During the period from time t1 to time t2, the voltage generated between the source of the MOSFET Q2 and the source of the MOSFET Q1 is a voltage determined by the product of the current flowing through the resistor R1 and the resistor R2 and the total resistance value of the resistor R1 and the resistor R2. Assuming that Vgth2 is constant during this period, the voltage generated between the source of the MOSFET Q2 and the source of the MOSFET Q1 is constant, and when the resistance value of the resistor R1 is indicated by R1 and the resistance value of the resistor R2 is indicated by R2, a magnitude can be approximated by $|Vgth2| \times (R1+R2)/R1$.

Therefore, during this period, since the voltage Vc1 of the capacitor C1 is constant at $|Vgth2| \times (R1+R2)/R1 - Vf$, the MOSFET Q2, the resistor R1, the resistor R2, and the diode D may be selected so that this value becomes the target maximum voltage Vcref1 of the desired capacitor C1.

During this period, the power accumulated in the capacitor C1 is consumed as the standby power of the drive circuit 1, but, the capacitor C1 is charged so that the voltage of the capacitor C1 becomes constant at the target maximum voltage Vcref1. Thus, the decrease in the voltage of the capacitor C1 is prevented.

A period from time t3 to time t0 is a rectification period, and a rectified current flows from the anode A to the cathode K. The resistances of the resistor R1 and the resistor R2 are selected so that the total resistance value of the resistor R1 and the resistor R2 is sufficiently greater than the on resistance of the MOSFET Q1. As a result, the rectified current flows through the MOSFET Q1.

The drain-source voltage Vds1 of the MOSFET Q1 is applied to the MOSFET Q2, the resistor R1, and the resistor R2. At time t3, since the drain-source voltage Vds1 of the MOSFET Q1 is 0, the voltage to be applied to the resistor R1, that is, the voltage of the gate-source voltage Vgs2 of the MOSFET Q2 becomes 0. Since the MOSFET Q2 is an n-channel depletion MOSFET, the MOSFET Q2 is in an ON state.

In addition, the voltage detected by the comparator Co is 0.

In the rectifier circuit of the present embodiment (FIG. 3), similarly to the first embodiment (FIG. 1), the MOSFET Q2 is always in the on state, and the voltage Vc1 of the capacitor C1 is controlled not to become greater than the target maximum voltage Vcref1 by controlling the current flowing through the MOSFET Q2. Further, a decrease in the voltage of the capacitor C1 during the off period of the MOSFET Q1 is suppressed.

As an advantage of the present embodiment, since the control circuit 5 of the MOSFET Q2 is configured by a small number of components, the present embodiment can contribute to a cost reduction of the rectifier circuit.

Third Embodiment

Figure 4:
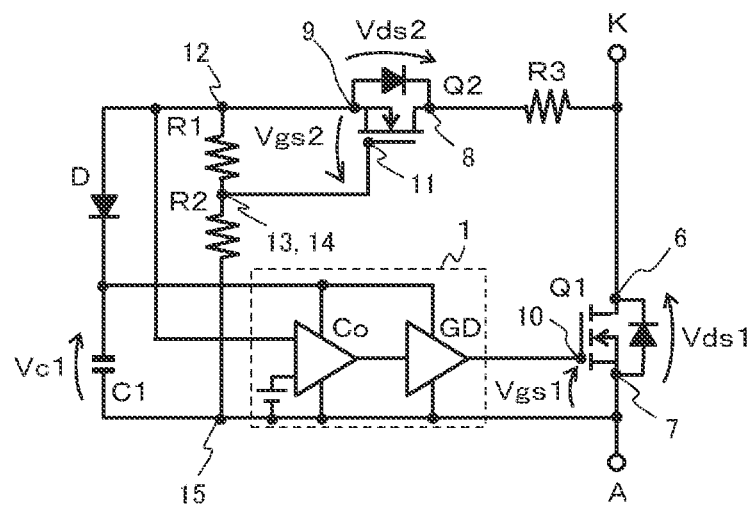
FIG. 4 is a diagram illustrating a configuration of a rectifier circuit according to a third embodiment of the present invention.

A configuration of a rectifier circuit according to a third embodiment of the present invention and a control method thereof will be described with reference to FIG. 4. FIG. 4 is a diagram illustrating the configuration of the rectifier circuit according to the present embodiment.

As illustrated in FIG. 4, the rectifier circuit of the present embodiment includes a resistor R3 inserted between the drain of the MOSFET Q1 and the drain of the MOSFET Q2.

In the rectifier circuits of the first and second embodiments, when the capacitor C1 is charged, the charging current of the capacitor C1 flows through the path of the drain terminal of the MOSFET Q1, the MOSFET Q2, the diode D, the capacitor C1, and the source terminal of the MOSFET Q1.

In particular, immediately after the start of charging of the capacitor C1, the charging current sharply increases. As a result, efficiency of the rectifier circuit may be degraded due to an increase in loss in a charging current path, and a temperature rise exceeding the rating of the MOSFET Q2 or the diode D may occur.

Therefore, in the rectifier circuit of the present embodiment, due to insertion of the resistor R3 in series on the charging current path, a steep increase in the charging current of the capacitor C1 is suppressed. That is, the resistor R3 functions as a rush current prevention resistor.

As an advantage of the present embodiment, it is possible to suppress degradation in efficiency of the rectifier circuit due to an increase in loss in the charging current path and a temperature rise of the MOSFET Q2 or the diode D.

Fourth Embodiment

Figure 5:
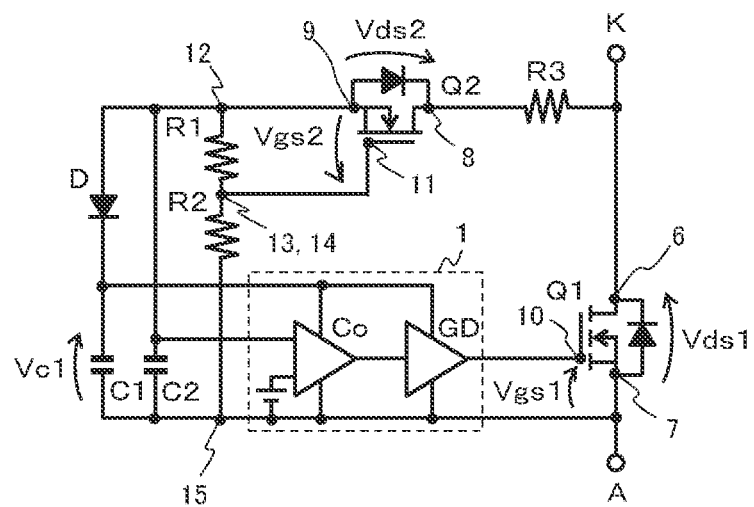
FIG. 5 is a diagram illustrating a configuration of a rectifier circuit according to a fourth embodiment of the present invention.

A configuration of a rectifier circuit according to a fourth embodiment of the present invention and a control method thereof will be described with reference to FIG. 5. FIG. 5 is a diagram illustrating the configuration of the rectifier circuit according to the present embodiment.

As illustrated in FIG. 5, the rectifier circuit of the present embodiment includes a capacitor C2 having a positive electrode terminal connected to the source terminal of the MOSFET Q2 and a negative electrode terminal connected to the source terminal of the MOSFET Q1.

In the rectifier circuits of the first to third embodiments, the comparator Co may malfunction due to radio frequency noise included in the voltage detected by the comparator Co. As a result, for example, the MOSFET Q1 is turned off during the rectification period, and the loss reduction effect due to the synchronous rectification is degraded.

Therefore, in the rectifier circuit of the present embodiment, the on resistance of the MOSFET Q2, the resistor R3, and the capacitor C2 constitute a low-pass filter, thereby suppressing radio frequency noise included in the voltage detected by the comparator Co.

Note that, even in a case where the resistor R3 is not inserted, the on resistance of the MOSFET Q2 and the capacitor C2 can constitute the low-pass filter. Thus, radio frequency noise included in the voltage detected by the comparator Co can be suppressed similarly.

As an advantage of the present embodiment, the loss reduction effect due to the synchronous rectification is not degraded by suppressing a malfunction of the comparator Co and unintentional turning-on and turning-off of the MOSFETs.

Fifth Embodiment

A configuration of a rectifier circuit according to a fifth embodiment of the present invention and a control method thereof will be described with reference to FIG. 3. FIG. 3 illustrates a configuration of the rectifier circuit of the present embodiment together with the second embodiment.

In general, as the temperature of the MOSFET increases, the gate threshold voltage decreases. In the rectifier circuits described in the second through fourth embodiments, the target maximum voltage Vcref1 of the capacitor C1 can be approximated by $|Vgth2| \times (R1+R2)/R1 - Vf$. Therefore, when the temperature of the rectifier circuit increases, the temperature of the MOSFET Q2 increases, the gate threshold voltage Vgth2 (negative value) of the MOSFET Q2 decreases, the absolute value $|Vgth2|$ increases, and the target maximum voltage Vcref1 of the capacitor C1 increases. This causes a problem that the voltage Vc1 of the capacitor C1 becomes greater than the maximum rated voltage of the drive circuit 1 or the maximum rated voltage between the gate and the source of the MOSFET Q1, and the drive circuit 1 or the MOSFET Q1 is destroyed.

Therefore, in the rectifier circuit of the present embodiment, $(R1+R2)/R1$ may be configured to decrease with an increase in temperature in the rectifier circuit illustrated in FIG. 3. For example, a resistor having a positive temperature coefficient may be used as the resistor R1, or a resistor having a negative temperature coefficient may be used as the resistor R2.

In the rectifier circuit of the present embodiment, when the temperature of the rectifier circuit rises, the absolute value $|Vgth2|$ of the gate threshold temperature of the MOSFET Q2 increases due to the temperature rise of the MOSFET Q2. However, since the resistance value of the resistor R1 increases due to the temperature rise of the resistor R1 and the resistance value of the resistor R2 decreases due to the temperature rise of the resistor R2, $(R1+R2)/R1$ decreases, and an increase in the target maximum voltage Vcref1 of the capacitor C1 can be suppressed.

As an advantage of the present embodiment, it is possible to suppress an increase in the voltage of the capacitor caused by a temperature rise of the rectifier circuit and to prevent breakage of the rectifier circuit.

Further, at least one of the resistor R1 and the resistor R2 may be a variable resistor.

Sixth Embodiment

A semiconductor package according to a sixth embodiment of the present invention will be described with reference to FIGS. 6 and 7.

Figure 6:
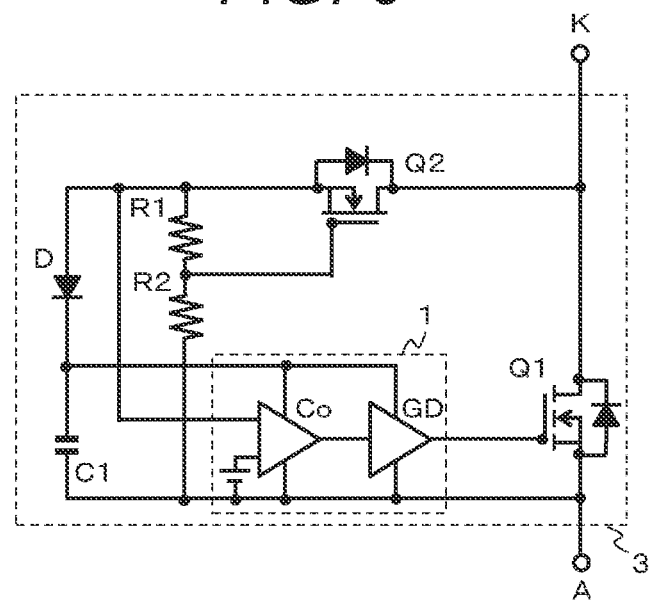
FIG. 6 is a diagram illustrating a configuration of a semiconductor package according to a sixth embodiment of the present invention.

FIG. 6 illustrates a configuration where the rectifier circuits described in the first to fifth embodiments are incorporated in a semiconductor package 3. The semiconductor package 3 includes a cathode K and an anode A as external terminals.

Figure 7:
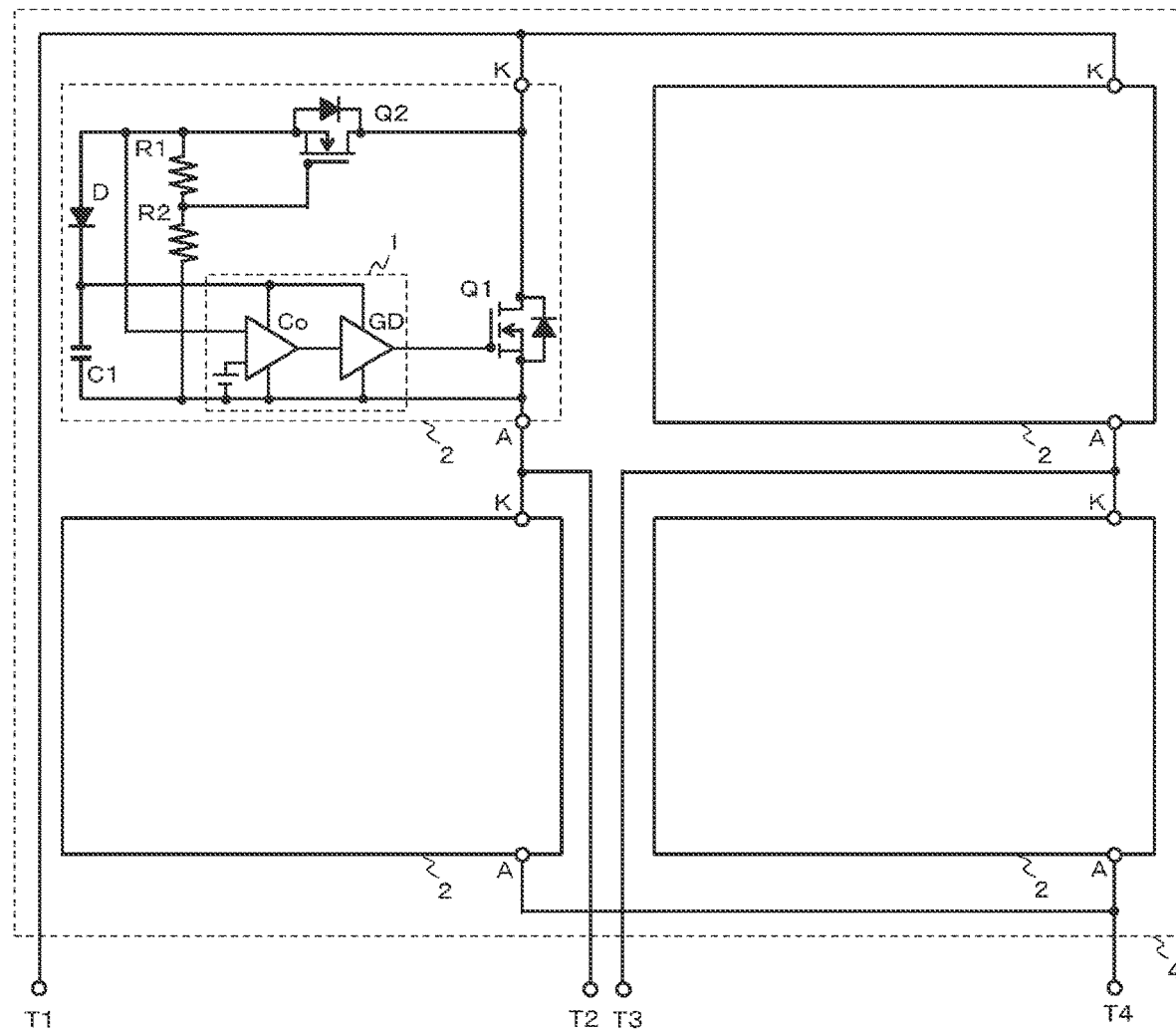
FIG. 7 is a diagram illustrating a configuration of the semiconductor package according to the sixth embodiment of the present invention.

FIG. 7 illustrates a configuration where a bridge circuit configured by using four rectifier circuits 2 described in first to fifth embodiments are incorporated in a semiconductor package 4. The semiconductor package 4 includes terminals T1 to T4 as external terminals.

FIGS. 6 and 7 illustrate the rectifier circuit described in the second embodiment (FIG. 3) as an example, but the rectifier circuits described in the other embodiments may be used.

As an advantage of the present embodiment, when a product using the rectifier circuit is designed and manufactured, the rectifier circuit incorporating a drive circuit and a capacitor as in the present embodiment may be purchased and incorporated, and a control circuit does not have to be incorporated into a design and manufacturing process. This produces an effect that man-hours for design and mounting can be reduced.

Seventh Embodiment

A front end power supply according to a seventh embodiment of the present invention will be described with reference to FIG. 8.

Figure 8:
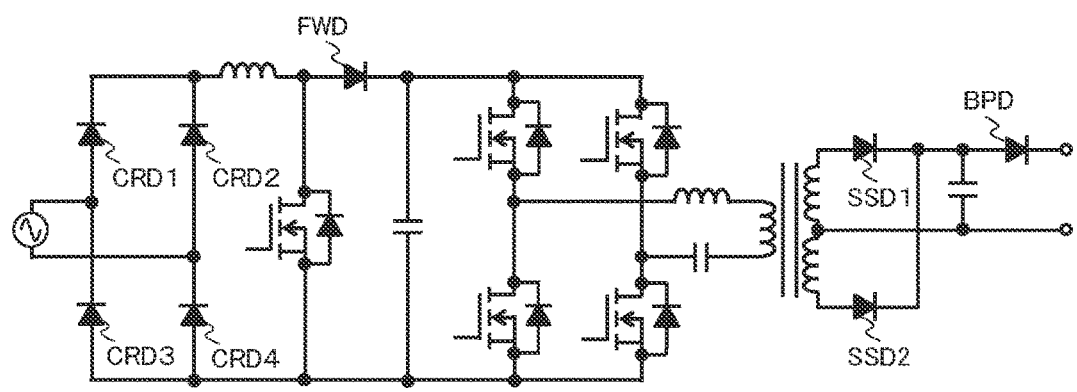
FIG. 8 is a diagram illustrating a configuration of a front end power supply according to a seventh embodiment of the present invention.

FIG. 8 illustrates an example of a power supply to which the rectifier circuits of the present invention described in the first to sixth embodiments are applied.

An application range of the present invention is a general rectifier circuit used for a power inverter. For example, in the front end power supply as illustrated in FIG. 8, the rectifier circuit of the present invention can be replaced as a rectifier circuit used in portions where commercial rectification diodes CRD1 to CRD4, a freewheeling diode FWD, secondary rectification diodes SSD1 and SSD2, and a backflow prevention diode BPD.

The rectifier circuit of the present invention is applied to a power supply such as a front end power supply, and this application can contribute to an improvement in power density and cost reduction of the power supply.

Note that the present invention is not limited to the above-described embodiments, and includes various modifications. For example, the above-described embodiments have been described in detail for easy understanding of the present invention, and are not necessarily limited to those having all the described configurations. Further, a part of the configuration of one embodiment can be replaced with the configuration of another embodiment, and the configuration of another embodiment can be added to the configuration of one embodiment. In addition, the other configurations can be added to, deleted from a part of the configuration in each embodiment, and a part of the configuration in each embodiment can be replaced with the other configurations.

REFERENCE SIGNS LIST 1 drive circuit (of MOSFET Q1)
2 rectifier circuit
3, 4 semiconductor package
5 control circuit (of MOSFET Q2)
6 first terminal (drain terminal of MOSFET Q1)
7 second terminal (source terminal of MOSFET Q1)
8 third terminal (drain terminal of MOSFET Q2)
9 fourth terminal (source terminal of MOSFET Q2)
10 fifth terminal (gate terminal of MOSFET Q1)
11 sixth terminal (gate terminal of MOSFET Q2)
12 seventh terminal (one terminal of resistor R1)
13 eighth terminal (the other terminal of resistor R1)
14 ninth terminal (one terminal of resistor R2)
15 tenth terminal (the other terminal of resistor R2)
T1 to T4 terminal
K cathode
A anode
C1, C2 capacitor
R1, R2, R3 resistor
Q1, Q2 MOSFET
D diode
Co comparator
GD gate driver
t0 to t3 time
Vcref1 target maximum voltage of capacitor C1 supplying power to drive circuit 1
Vcref2 target minimum voltage of capacitor C1 supplying power to drive circuit 1
Vf forward voltage of diode D
Vds1, Vds2 drain-source voltages of MOSFETs Q1 and Q2
Vgs1, Vgs2 gate-source voltages of MOSFETs Q1 and Q2
Vgth1, Vgth2 gate threshold voltages of MOSFETs Q1 and Q2
CRD1 to CRD4 commercial rectification diode
FWD freewheeling diode
SSD1, SSD2 secondary rectification diode
BPD backflow prevention diode

The invention claimed is:

1. A rectifier circuit having an anode and a cathode, the rectifier circuit comprising:
    a first switching element having a first terminal connected to the cathode of the rectifier circuit and a second terminal connected to the anode of the rectifier circuit;
    a first diode having a cathode connected to the first terminal and an anode connected to the second terminal;
    a second switching element having a third terminal connected to the first terminal;
    a second diode having an anode connected to a fourth terminal of the second switching element;
    a first capacitor having a positive electrode terminal connected to a cathode of the second diode and a negative electrode terminal connected to the second terminal;
    a comparator that detects a voltage between the fourth terminal and the second terminal and obtains power from the first capacitor;
    a gate driver having an input terminal connected to an output terminal of the comparator and an output terminal connected to a fifth terminal of the first switching element, the fifth terminal for control of the first switching element, the gate driver controlling the first switching element based on an output signal from the comparator; and
    a control circuit connected to a sixth terminal of the second switching element receiving a signal for controlling the second switching element,
    wherein the control circuit controls the second switching element to be always in an on state and controls a voltage between the sixth terminal and the fourth terminal of the second switching element so that a voltage of the first capacitor does not become greater than a predetermined target voltage so as to control a current flowing from the third terminal to the fourth terminal of the second switching element.

2. The rectifier circuit according to claim 1, wherein
    the first switching element is a first metal oxide semiconductor field-effect transistor (MOSFET) having a drain terminal, a source terminal, and a gate terminal respectively corresponding to the first terminal, the second terminal, and the fifth terminal of the first switching element, and
    the first diode is a body diode of the first MOSFET.

3. The rectifier circuit according to claim 1, wherein the second switching element is a second MOSFET having a drain terminal, a source terminal, and a gate terminal respectively corresponding to the third terminal, the fourth terminal, and the sixth terminal of the second switching element.

4. The rectifier circuit according to claim 3, wherein the second MOSFET is an n-channel depletion MOSFET, and
    the control circuit includes a first resistor having a seventh terminal connected to a source terminal of the second MOSFET and an eighth terminal connected to a gate terminal of the second MOSFET, and a second resistor having a ninth terminal connected to the gate terminal of the second MOSFET and a tenth terminal connected to the second terminal.

5. The rectifier circuit according to claim 4, wherein when the first resistor has a resistance value R1 and the second resistor has a resistance value R2, a value (R1+R2)/R1 decreases with temperature rise.

6. The rectifier circuit according to claim 4, wherein at least one of the first resistor and the second resistor is a variable resistor.

7. The rectifier circuit according to claim 1, further comprising a third resistor having one terminal connected to the first terminal and the other terminal connected to the third terminal.

8. The rectifier circuit according to claim 1, further comprising a second capacitor having a positive electrode terminal connected to the fourth terminal and a negative electrode terminal connected to the second terminal.

9. The rectifier circuit according to claim 1, wherein the comparator has a first threshold and a second threshold, generates an on signal of the first switching element in a case where the detected voltage between the fourth terminal and the second terminal is smaller than the first threshold, and generates an off signal of the first switching element in a case where the detected voltage between the fourth terminal and the second terminal is greater than the second threshold.

10. The rectifier circuit according to claim 1, wherein the predetermined target voltage of the first capacitor is equal to or lower than a lowest maximum rated voltage among a maximum rated voltage of the comparator, a maximum rated voltage of the gate driver, and a maximum rated voltage between the fifth terminal and the second terminal of the first switching element.

11. The rectifier circuit according to claim 1, wherein one or more of the rectifier circuits are incorporated in an identical semiconductor package.

12. A power supply comprising the rectifier circuit according to claim 1.

* * * * *